F. B. CONVERSE.
TIRE BUILDING MACHINE.
APPLICATION FILED JUNE 13, 1918.
1,316,356.
Patented Sept. 16, 1919.
2 SHEETS—SHEET 1.
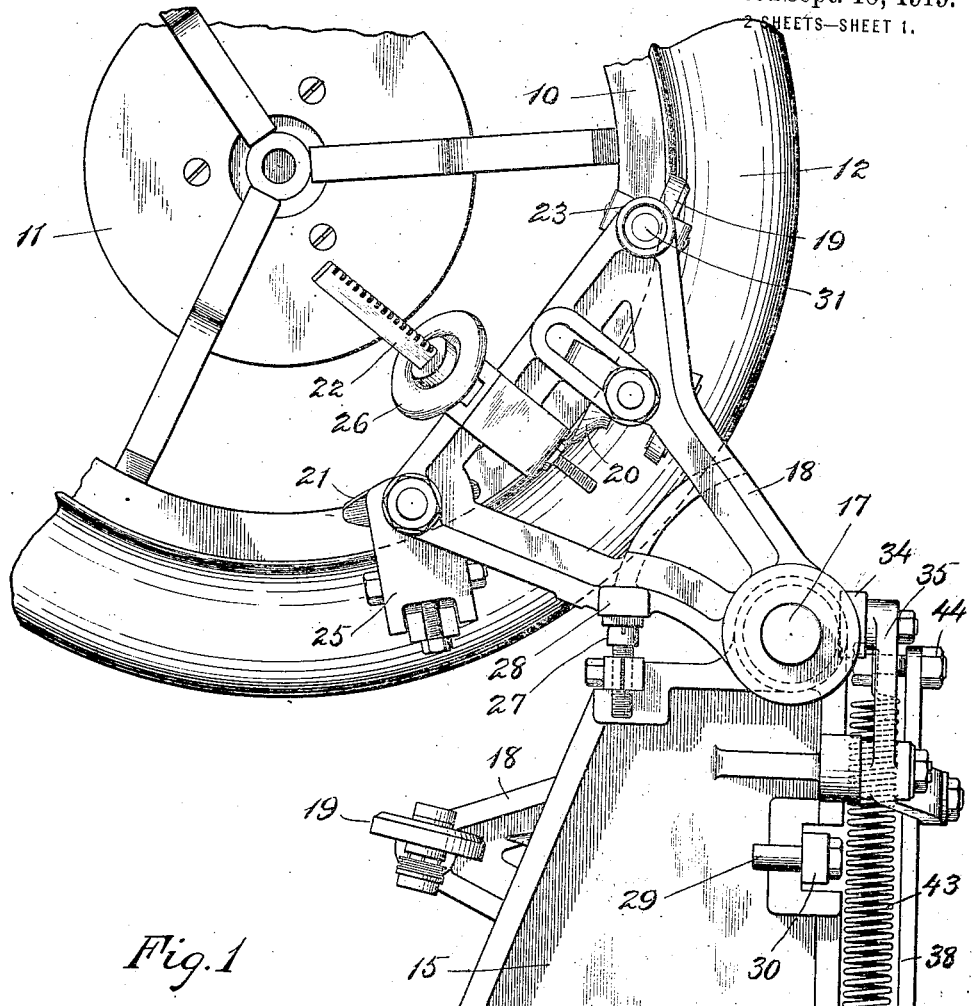
Fig.1
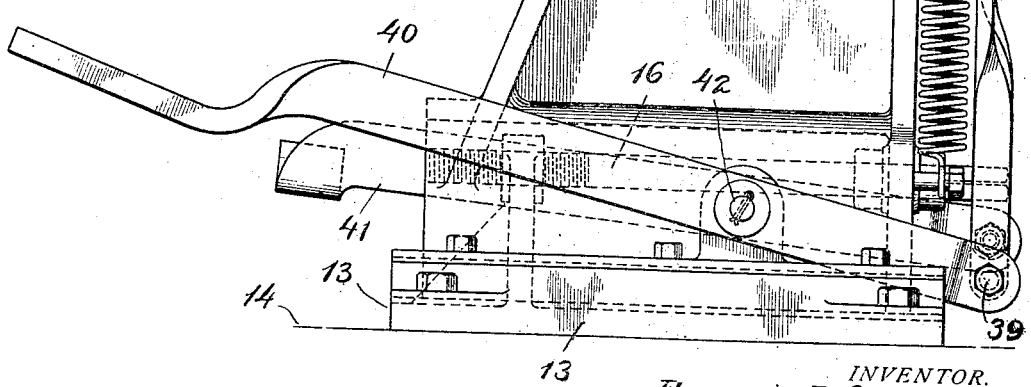
INVENTOR.
Francis B. Converse
BY Robert M. Pierson
ATTORNEY

UNITED STATES PATENT OFFICE.

FRANCIS B. CONVERSE, OF AKRON, OHIO, ASSIGNOR TO THE B. F. GOODRICH COMPANY, OF NEW YORK, N. Y., A CORPORATION OF NEW YORK.

TIRE-BUILDING MACHINE.

1,316,356.　　　　Specification of Letters Patent.　　Patented Sept. 16, 1919.

Application filed June 13, 1918. Serial No. 239,737.

*To all whom it may concern:*

Be it known that I, FRANCIS B. CONVERSE, a citizen of the United States, residing at Akron, in the county of Summit and State of Ohio, have invented a certain new and useful Tire-Building Machine, of which the following is a specification.

This invention relates to machines for building the carcasses of pneumatic tire casings, and its object is to provide an improved mode of mounting the tools which work upon the sides of the casing, and especially those for working around the beads.

Of the accompanying drawings,

Figure 1 is a side elevation showing a portion of a tire-building machine provided with my improvements.

Figure 2:
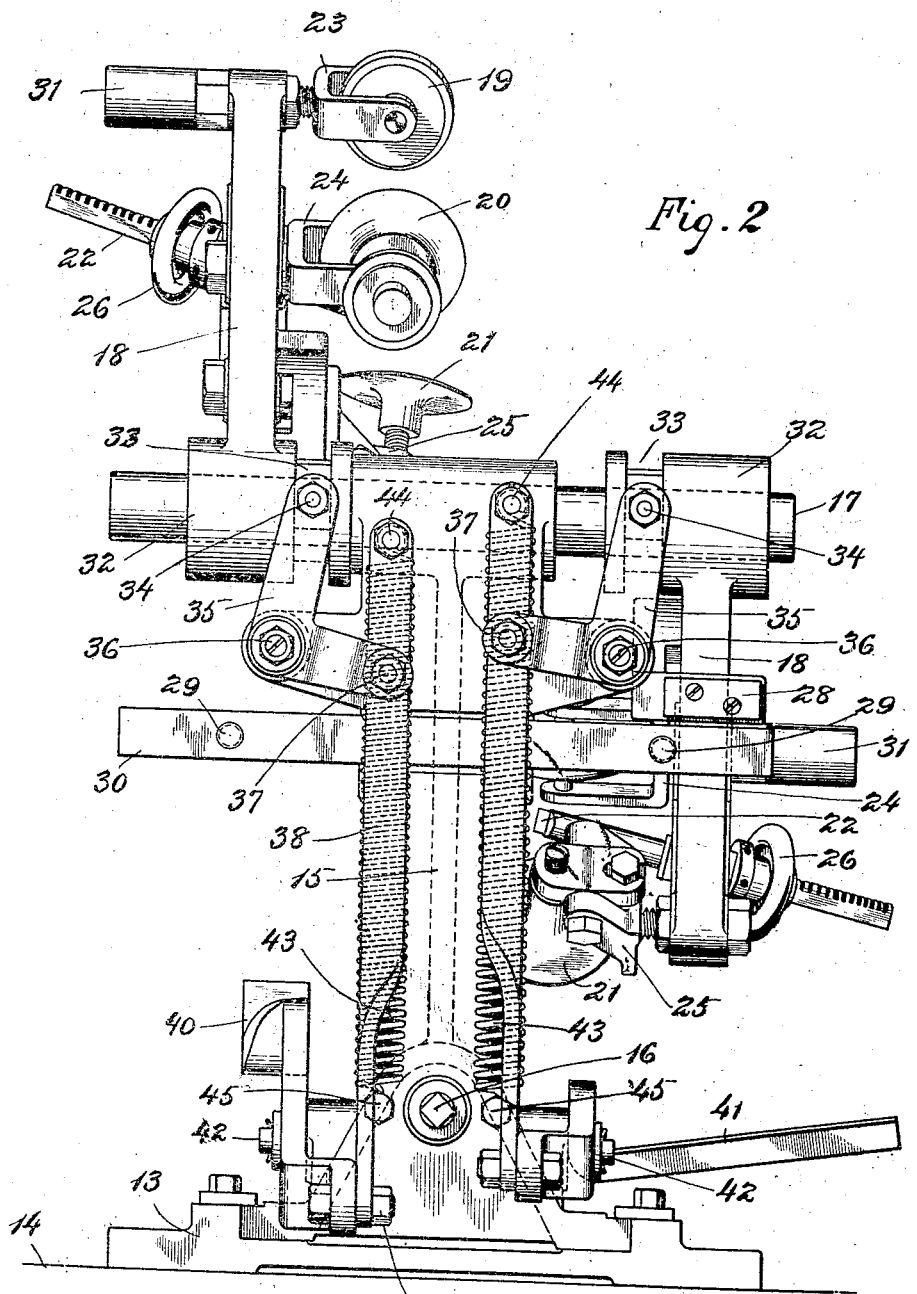
Fig. 2 is an end elevation thereof, omitting the core.

In the drawings, 10 is the ring core or mandrel supported upon the usual power-driven chuck 11 and adapted to rotate in a vertical plane. Fig. 1 shows a tire carcass 12 on the core. 13 is a base mounted on the floor 14, and 15 is a frame or standard slidingly mounted in guides on said base and adapted to be adjusted horizontally toward and from the core by means of a screw 16. The standard 15 carries at its upper end a fixed, transverse shaft 17 whose two ends constitute arbors or pivot shafts on which are slidingly and rotatably mounted a pair of triangular tool carriers 18, 18, each of which has mounted thereon a set of fabric-working tools for operating upon and around the tire beads. These tools may be of any suitable character, there being here shown three rollers 19, 20, 21 of different kinds for pressing and smoothing the tire fabric above and below the beads, and a knife 22 for trimming the edges of the fabric. The rollers are mounted on swivels 23, 24, 25, which are suitably constructed and mounted to furnish the necessary adjustments, and the knife is provided with the usual toothed or threaded stem and adjusting nut 26.

To support the tool carriers in their elevated operative positions, there is provided a pair of adjustable stop screws 27, one of which is shown in Fig. 1, mounted upon the standard 15 and contacting with an abutment 28 on the tool carrier. Other stops 29 mounted on a cross-bar 30 on the standard arrest or support the tool carriers in their depending inoperative positions. For swinging the tool carriers from one position to the other they are provided with laterally-projecting handles 31 at their upper corners.

For sliding the tool carriers axially or horizontally into and out of their operative planes, the hub 32 of each is formed with a groove 33 occupied by a stud 34 on the upright arm of a bell-crank lever 35 which is pivoted at 36 to the standard 15, the horizontal arm of said lever being pivoted at 37 to a vertical link 38 whose lower end is pivoted at 39 to the short arm of a treadle lever 40 or 41, fulcrumed on the standard at 42. A spring 43 has its upper end connected with a stud 44 on an upper extension of the link, and its lower end connected with a fixed stud 45 on the standard, the springs tending to depress the links and move the tool carriers axially inward.

The tool carrier 18 at the front in Fig. 1 is shown in its elevated operative position, and the one at the left in Fig. 2 in correspondingly elevated, while the other has been depressed to an inoperative position by swinging it downwardly, and inwardly toward the vertical axial plane of the core. The core being omitted in Fig. 2, the hub of the left-hand carrier is shown abutting against the standard. In its operative position, it is somewhat retracted to the left, and the spring 43 yieldingly holds said carrier with its rollers pressed laterally against the tire. The right-hand carrier in this view is shown partially retracted by the depression of the treadle 41. The extreme outward sliding of the carrier clears the tools from the tire core, and also enables the abutment 28 to clear the upper stop 27. The carrier is manually raised or lowered by grasping the handle 31 while said carrier is maintained in its outwardly-slid position by pressure on the treadle, and when the pressure is released the spring 43 draws the carrier back into its normal plane, whereupon it is allowed to rest on either of the stops 27 or 29.

Heretofore, swinging and sliding tool-carriers of the type here shown have been placed substantially level with the middle horizontal plane of the ring-core, and mounted to swing upward and backward from their operative positions. My improved arrangement involves less muscular effort on the part of the attendants in shifting the tool-carriers, requires less travel on their part in walking around the machine, reduces the amount of floor-space occupied by the latter, and leaves the space in front of the tire (at the right in Fig. 1) unobstructed for performing operations thereon such as applying the rubber tread.

I claim:

1. In a tire-building machine, the combination of a ring core adapted to rotate in a vertical plane, and a tool-carrier having a tool for working substantially on the side of the tire, said carrier being mounted to swing inwardly toward the vertical axial plane of the core, and downwardly, to an inoperative position, leaving an unobstructed space in front of the middle edge portion of the core.

2. In a tire-building machine, the combination of a ring-core adapted to rotate in a vertical plane, and a pair of tool carriers having tools for working on the tire beads, said carriers being mounted for axial sliding movements and also adapted to swing inwardly and downwardly to inoperative positions below the middle horizontal plane of the core.

3. In a tire-building machine, the combination of a ring core adapted to rotate in a vertical plane, a bead-tool carrier mounted for vertical swinging and horizontal axial sliding movements, said carrier being adapted to be manually swung inwardly and downwardly to its inoperative position, and a treadle for imparting the axial sliding movement to said carrier.

In testimony whereof I have hereunto set my hand this 11 day of June 1918.

FRANCIS B. CONVERSE.